UNITED STATES PATENT OFFICE.

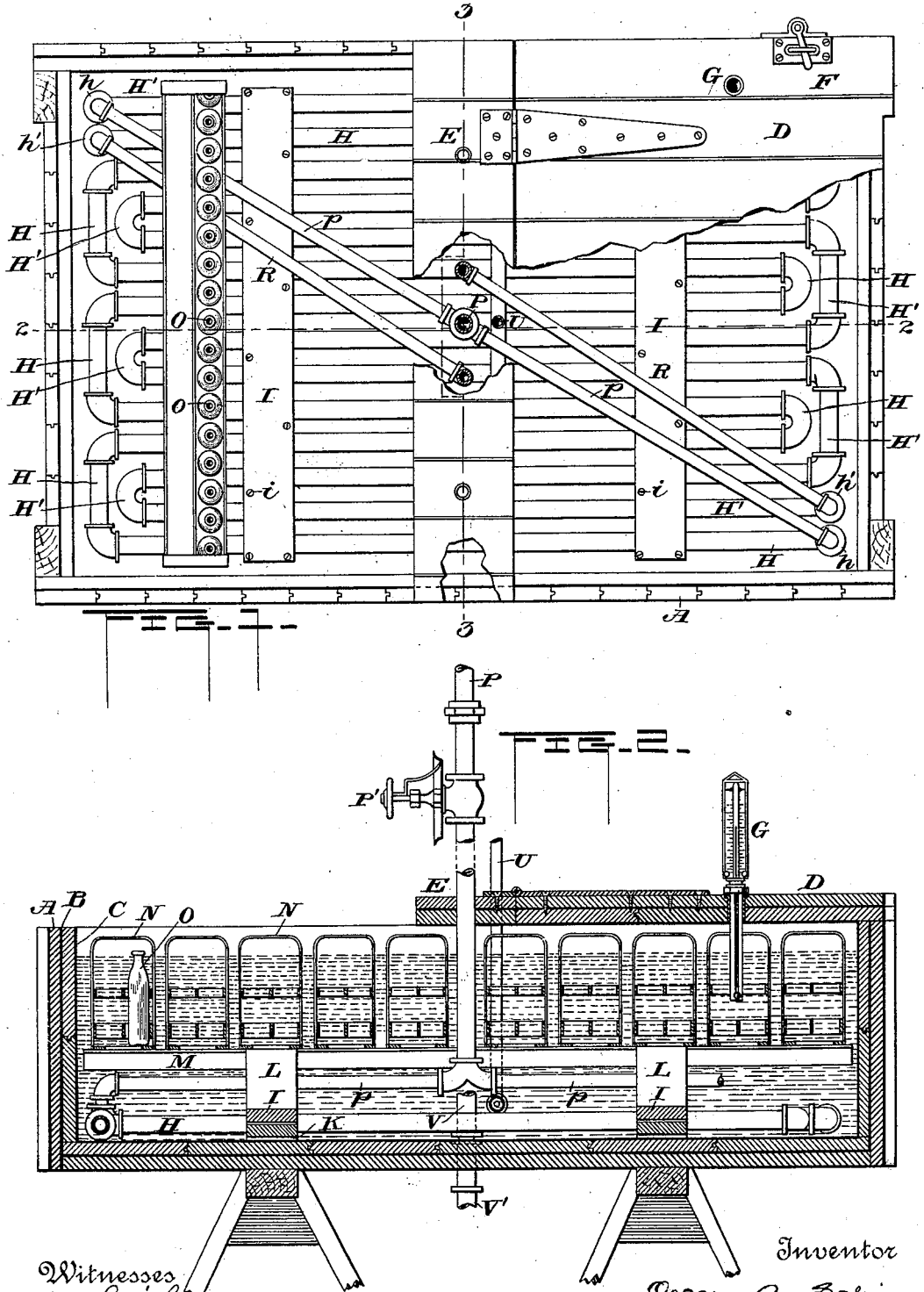

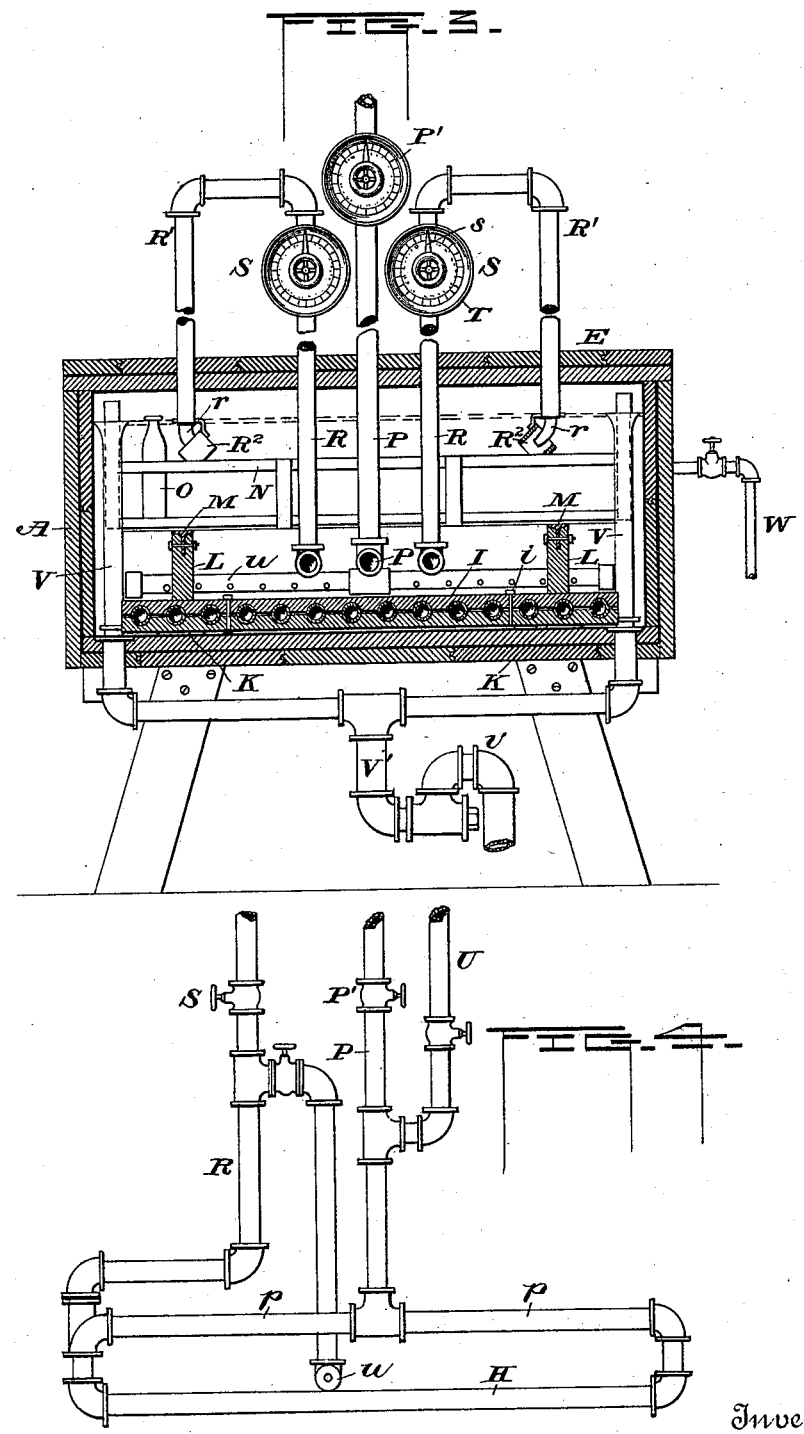

OSCAR B. SCHIER, OF BALTIMORE, MARYLAND.

PASTEURIZING APPARATUS.

SPECIFICATION forming part of Letters Patent No. 562,038, dated June 16, 1896.

Application filed January 25, 1896. Serial No. 576,807. (No model.)

*To all whom it may concern:*

Be it known that I, OSCAR B. SCHIER, a citizen of Germany, residing at Baltimore, in the State of Maryland, have invented certain new and useful Improvements in Pasteurizing Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to apparatus for pasteurizing or sterilizing milk and other articles of food. In carrying out these processes it is quite necessary to maintain an even temperature throughout the entire chamber in which the bottles or other food-containing vessels are contained, so that the results may be uniform in all the vessels. Heretofore it has been difficult to do this, owing to the imperfect or wrong construction of the apparatus employed. My invention overcomes this difficulty and produces a temperature in the heating-chamber which does not vary one-half a degree from a given rate at any point therein.

In pasteurizing and sterilizing the object is to destroy by heat the germs which may be contained in the milk or other liquid food. For sterilizing a temperature of 100° centigrade (212° Fahrenheit) to $102\frac{1}{2}°$ centigrade ($216\frac{1}{2}°$ Fahrenheit) is required. Pasteurizing, on the contrary, requires a temperature between 68° centigrade (155° Fahrenheit) and 75° centigrade, (166° Fahrenheit.) The principle of pasteurizing is to heat the liquid quickly to the given temperature and expose it to the same for twenty-five to thirty-five minutes, according to the season of the year. After a proper exposure it must be cooled down as quickly as possible.

In sterilizing it is easy to obtain and maintain the necessary temperature by the use of steam whose temperature ranges from 100° centigrade upward; but some difficulty arises from using steam directly when the temperature is below boiling, owing to the well-nigh impossibility of controlling the heating effect. In almost all devices for pasteurizing, therefore, water is used as the heating medium, from which arises the difficulty of getting an even temperature in all parts of the apparatus.

In my improved apparatus I use a water-tank, containing a steam-coil of peculiar construction, whereby the water is evenly heated to any given temperature. Suitable arrangements are made for cooling quickly, and in practice the apparatus has proved most satisfactory.

In the drawings, Figure 1 is a top plan view of my apparatus. Fig. 2 is a longitudinal sectional elevation on line 2 2, Fig. 1. Fig. 3 is a cross-section on line 3 3, Fig. 1. Fig. 4 is a modification.

The tank A is of any suitable size and shape, preferably rectangular, and is composed, preferably, of tongue-and-grooved boards. The walls are preferably double, with a layer of non-conducting material B, as asbestos, between them. The tank is lined with metal C, such as galvanized iron, and has a suitable cover, preferably two lids D, hinged to a middle cross-bar E. The lids may be fastened by lever-handles F, such as are used upon ice-chests. At any convenient point or points, such as in one of the lids D, is inserted one or more thermometers G, having the bulb depending through the lid into the tank and the scale located above the lids, as shown.

In the lower part of the tank is the double steam-coil made in two similar parts H H', each composed of a pipe arranged in parallel loops, the loops of one part fitting into and between the loops of the other part, just as the tines of two forks might be alternated with each other. The two coils H H' are exactly alike, and when placed in position the inlet $h$ of one lies adjacent to the outlet $h'$ of the other, preferably at diagonally opposite corners of the tank, as shown. The two coils are held in position, with all the pipes in the same plane and parallel with the bottom of the tank, by means of spacing-bars I, of wood or metal, having semicylindrical notches to receive the pipes. They are placed one above and below the pipes and are fastened together by bolts $i$. Thin blocks K raise the clamping-bars and coils to a suitable height above the bottom of the tank. From the clamping-bars I rise standards L, in which are secured the metallic T-rails M, running parallel with each other the length of the tank and serving to support the metallic crates N, containing the bottles or other vessels O for the liquid to be treated. The main steam-pipe P has a stop-valve P' and enters the tank at the middle, being preferably passed through and supported by the cross-bar E. From it branch pipes $p$ run diagonally above the coils H H' to the opposite corners of the tank, where they connect with the inlets $h$ of the coils. The adjacent outlets $h'$ are connected with escape-pipes R, which run back parallel with the pipes P and rise through the cross-bar E near the main steam-pipe P. In each escape-pipe R there is a stop-valve S, the stem of which has an index $s$ moving over a circular scale T, secured to the body of the valve. Above the valve the pipe has a return-bend R' and extends down toward or into the tank A. At the lower end the part R' has an elbow or nozzle $r$, preferably inclined downward at about forty-five degrees. It is preferably surrounded by a hood or short length of pipe $R^2$, extending a little beyond the mouth of the nozzle. Adjacent to the main steam-pipe P or at any other convenient point is a pipe U, connected with a cold-water supply and depending into the tank. At its lower end it connects with one or more perforated headers $u$, so that a supply of cooling-water can be led into the tank in jets. The perforations in the header $u$ are so arranged that the jets are directed downward away from the bottles O. If desired, the cooling-water may be caused to traverse the steam-coils before entering the tank, as by the arrangement of pipes shown in Fig. 4.

At two or more points in the tank are upright overflow-pipes V, whose open tops stand at the predetermined level of the water, and whose lower ends fit removably into outlet-pipes passing down through the bottom of the tank and uniting in a common discharge-pipe V', in which is a trap $v$ to prevent the entrance of cold air into the tank. A discharge-pipe W may be provided to draw off the hottest water and carry it to a reservoir for further utilization, such as washing the bottles.

The operation of the apparatus is as follows: To sterilize the empty bottles before they are filled, they are placed, after cleaning and washing and providing them with the disk stoppers described in my Patent No. 522,135, in galvanized baskets N, which are put into the tank upon the rails M. The tank is then filled with water high enough to just cover the coils H H'. All the steam-valves are then opened wide until the water of condensation begins to leave the outlets. Then the outlet-valves B are partially closed to allow only steam enough to flow through the coils to heat the water quickly to the boiling-point. The space above the water is filled with the live steam thus generated, which sterilizes the empty bottles. After cooling down gradually they are ready to be filled. If milk is the liquid to be treated, it must be fresh and should be thoroughly strained or run through a centrifugal separator. The filled bottles are put into the baskets and placed in the tank, which is filled with water high enough to reach an inch above the bottles. Steam is then turned into the coils, passing in opposite directions through them, so that the sum of the heating capacity of any two adjacent lengths of pipe in different loops is constant at any part of the tank. In this way a complete equalization of temperature is secured, the outlet-valves S being set exactly alike, so that the quantity of steam passing through one coil is precisely the same as that passing through the other. The water of condensation escaping through the outlet-valves S is conducted back into the tank by the pipes R', and being injected with some force by the steam behind it it acts as a mixing-jet to stir up the water and assist in equalizing its temperature. The hoods T aid in this effect by causing the water to flow past the nozzles in a certain direction.

The degree of temperature is regulated by the valve P' in the main steam-pipe, admitting more or less, as may be required. When the required temperature is reached, it can be easily maintained, since the non-conducting character of the walls of the tank prevents any serious amount of radiation and reduces to a minimum the quantity of steam required to keep up the even heat. If desired, some of the thermometers may be inserted into the bottles to enable the temperature of the milk to be watched.

As soon as the heating process is completed cool water is admitted through the pipe U, thereby displacing the hot water from below and cooling the bottles quickly, yet at an even rate, so as to prevent them from breaking. The tank can be entirely emptied by pulling up the overflow-pipes V and allowing the water to escape through the outlets V'.

Having now described my invention, what I claim, and desire to secure by Letters Patent, is—

1. An apparatus for sterilizing or pasteurizing, comprising a tank having a double steam-coil in its lower part, each coil comprising loops alternating with those of the other coil, substantially as described.

2. An apparatus for sterilizing or pasteurizing, comprising a tank having in its lower part two parallel steam-coils, the inlet of one being adjacent to the outlet of the other, substantially as described.

3. An apparatus for sterilizing or pasteurizing, comprising a tank having in its lower part two steam-coils, the pipes composing one of said coils lying parallel with and adjacent to those of the other coil, and all in the same plane, a main steam-pipe having branches leading to the inlets of the two coils, and a separate outlet-pipe for each coil provided with a stop-valve, the inlet of one coil being adjacent to the outlet of the other substantially as described.

4. An apparatus for sterilizing or pasteurizing, comprising a tank containing a double steam-coil, the inlet of each coil being adjacent to the outlet of the other, a main steam-pipe having branches leading to the inlets, a stop-valve in said pipe, and two separate outlet-pipes each having a stop-valve, and terminating below the level of the water in the tank, substantially as described.

5. An apparatus for sterilizing or pasteurizing, comprising a tank having a steam-coil, an outlet-pipe for said coil provided with a valve and terminating below the level of the water in said tank, and a nozzle on the end of said pipe surrounded by an open-ended hood, substantially as described.

6. An apparatus for sterilizing or pasteurizing, comprising a tank containing a steam-coil in its lower part, a cold-water-supply pipe, and a header connected with said pipe and lying just above and transverse to said coil and containing perforations directed downwardly, substantially as described.

7. An apparatus for sterilizing or pasteurizing, comprising a tank containing a steam-coil, a cold-water-supply pipe, a perforated header lying just above said coil, and connections for directing the cooling-water through the steam-coil before it reaches the header, substantially as described.

8. An apparatus for sterilizing or pasteurizing, comprising a tank containing a double steam-coil, notched spacing-bars clamped upon said coil, and crate-supports carried by said bars, substantially as described.

9. An apparatus for sterilizing or pasteurizing, comprising a tank containing means for heating water therein, an outlet pipe or pipes leading from the bottom of said tank, and upright overflow-pipes removably inserted into said outlet-pipes, substantially as described.

In testimony whereof I affix my signature in presence of two witnesses.

OSCAR B. SCHIER.

Witnesses:
C. EUGENE KLEIN,
CHARLES T. DAVIS.